(12) United States Patent
Rhee et al.

(10) Patent No.: US 11,720,430 B2
(45) Date of Patent: Aug. 8, 2023

(54) METHOD FOR MITIGATING AN ERROR OF QUANTUM CIRCUIT AND APPARATUS THEREOF

(71) Applicant: Korea Advanced Institute of Science and Technology, Daejeon (KR)

(72) Inventors: June-Koo Rhee, Daejeon (KR); Changjun Kim, Daejeon (KR); Kyungdeock Park, Daejeon (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 225 days.

(21) Appl. No.: 17/072,170

(22) Filed: Oct. 16, 2020

(65) Prior Publication Data

US 2021/0200626 A1    Jul. 1, 2021

(30) Foreign Application Priority Data

Dec. 30, 2019  (KR) ......................... 10-2019-0177499

(51) Int. Cl.
| | |
|---|---|
| *G06F 11/07* | (2006.01) |
| *G06N 20/00* | (2019.01) |
| *G06N 10/00* | (2022.01) |
| *G06N 10/70* | (2022.01) |

(52) U.S. Cl.
CPC ...... *G06F 11/0751* (2013.01); *G06F 11/0706* (2013.01); *G06F 11/0775* (2013.01); *G06F 11/0793* (2013.01); *G06N 10/00* (2019.01); *G06N 10/70* (2022.01); *G06N 20/00* (2019.01)

(58) Field of Classification Search
CPC ..... G06F 11/07; G06F 11/0751; G06N 10/00; G06N 10/20; G06N 10/40; G06N 10/60; G06N 10/70; G06N 20/00
See application file for complete search history.

(56) References Cited

U.S. PATENT DOCUMENTS

| | | | |
|---|---|---|---|
| 11,288,121 B2 * | 3/2022 | Katabarwa | .......... G06F 11/1076 |
| 2005/0167658 A1* | 8/2005 | Williams | ............... B82Y 10/00 |
| | | | 257/31 |
| 2019/0005402 A1 | 1/2019 | Mohseni et al. | |
| 2019/0164034 A1 | 5/2019 | Gambetta et al. | |

(Continued)

OTHER PUBLICATIONS

Endo et al., "Hybrid Quantum-Classical Algorithms and Quantum Error Mitigation", 2021, Journal of the Physical Society of Japan 90, 032001 (Year: 2021).*

(Continued)

*Primary Examiner* — Michael Maskulinski
(74) *Attorney, Agent, or Firm* — The Webb Law Firm

(57) ABSTRACT

The present disclosure relates to a method of mitigating errors in quantum circuits constituting a quantum computer, which includes: obtaining a plurality of pieces of first probability matrix information according to a sequence of quantum gates constituting a quantum circuit; obtaining a plurality of pieces of second probability matrix information according to a sequence of quantum gates constituting the quantum circuit; generating a plurality of pieces of differential matrix information based on the plurality of pieces of first and second probability matrix information; and generating error mitigation matrix information corresponding to the quantum circuit using the plurality of pieces of differential matrix information.

18 Claims, 11 Drawing Sheets

(56) References Cited

U.S. PATENT DOCUMENTS

| | | | |
|---|---|---|---|
| 2019/0378032 A1* | 12/2019 | Kliuchnikov | G06N 10/00 |
| 2020/0119748 A1* | 4/2020 | Lucarelli | H03M 13/2906 |
| 2021/0194507 A1* | 6/2021 | Delfosse | H03M 13/1575 |
| 2021/0200626 A1* | 7/2021 | Rhee | G06F 11/0775 |
| 2022/0114047 A1* | 4/2022 | Rhee | G06N 3/08 |
| 2022/0230087 A1* | 7/2022 | Castrillo | G06N 10/40 |

OTHER PUBLICATIONS

Cramer et al., "Repeated quantum error correction on a continuously encoded qubit by real-time feedback", Nature Communications, 2016, pp. 1-7, vol. 7:11526.

Hu et al., "Demonstration of quantum error correction and universal gate set on a binomial bosonic logical qubit", Nature Physics, 2019, pp. 1-20, vol. 15.

Changjun et al., "Quantum Error Mitigation With Artificial Neural Network", IEEE Access, 2020, pp. 188853-188860, vol. 8, Creative Commons Attribution 4.0.

Song et al., "Quantum computation with universal error mitigation on a superconducting quantum compressor", Science Advances, Sep. 6, 2019, pp. 1-6, vol. 5, Creative Commons Non Commercial Attribution 4.0.

Temme et al., "Error mitigation for short-depth quantum circuits", Physical Review Letters, Nov. 2017, 16 pages, vol. 119 No 8.

\* cited by examiner

FIG. 1

| GATES | LOGIC SYMBOLS | DETERMINANTS |
|---|---|---|
| NOT | —[X]— | $\begin{bmatrix} 0 & 1 \\ 1 & 0 \end{bmatrix}$ |
| HADAMARD | —[H]— | $\frac{1}{\sqrt{2}} \begin{bmatrix} 1 & 1 \\ 1 & -1 \end{bmatrix}$ |
| PAULI-$X$ | —[X]— | $\begin{bmatrix} 0 & 1 \\ 1 & 0 \end{bmatrix}$ |
| PAULI-$Y$ | —[Y]— | $\begin{bmatrix} 0 & -i \\ i & 0 \end{bmatrix}$ |
| PAULI-$Z$ | —[Z]— | $\begin{bmatrix} 1 & 0 \\ 0 & -1 \end{bmatrix}$ |
| PHASE | —[S]— | $\begin{bmatrix} 1 & 0 \\ 0 & i \end{bmatrix}$ |
| $\pi/8$ | —[T]— | $\begin{bmatrix} 1 & 0 \\ 0 & e^{j\pi/4} \end{bmatrix}$ |
| CNOT | —⊕— | $\begin{bmatrix} 1 & 0 & 0 & 0 \\ 0 & 1 & 0 & 0 \\ 0 & 0 & 0 & 1 \\ 0 & 0 & 1 & 0 \end{bmatrix}$ |
| SWAP | —×— | $\begin{bmatrix} 1 & 0 & 0 & 0 \\ 0 & 0 & 1 & 0 \\ 0 & 1 & 0 & 0 \\ 0 & 0 & 0 & 1 \end{bmatrix}$ |

<QUANTUM GATES>

<QUANTUM CIRCUIT>

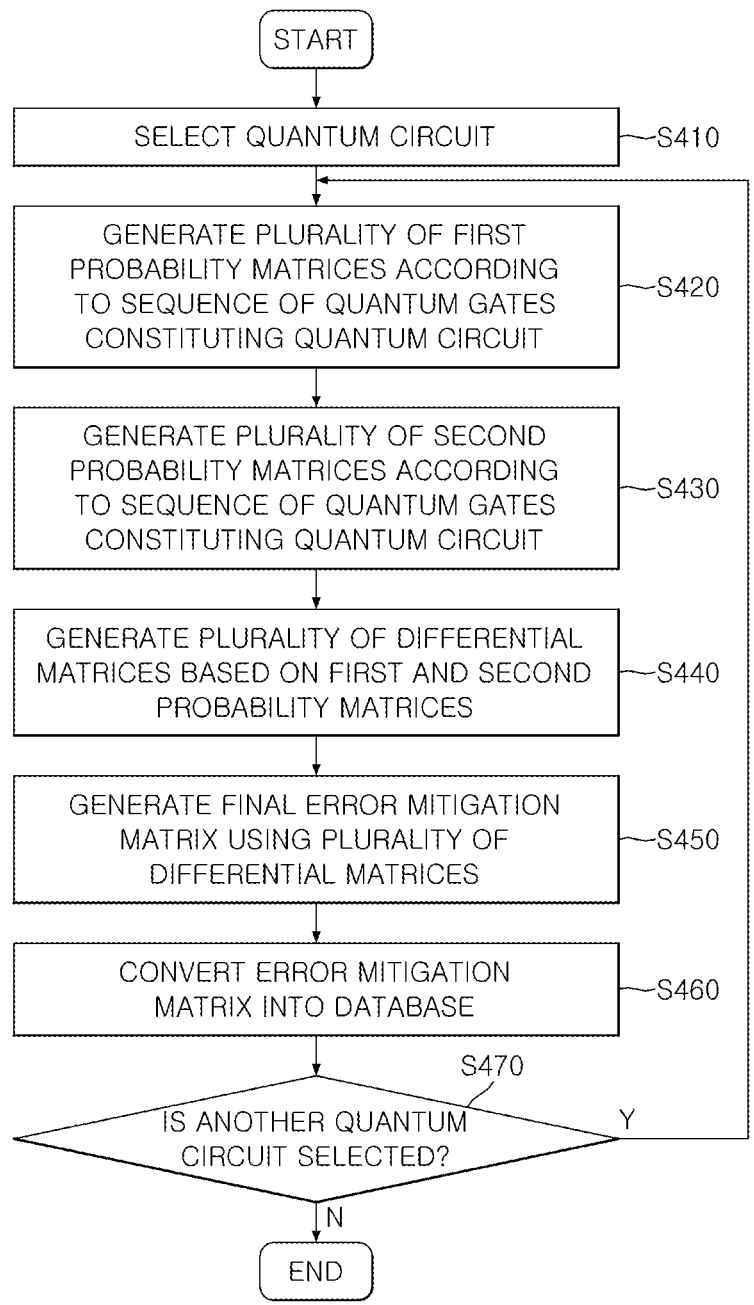

| NUMBERS | SEQUENCE COMBINATIONS OF QUANTUM GATES |
|---|---|
| 1 | A-B-C |
| 2 | A-C-B |
| 3 | B-A-C |
| 4 | B-C-A |
| 5 | C-A-B |
| 6 | C-B-A |

FIG. 5C

| IN / OUT | 0 | 1 |
|---|---|---|
| 0 | 1.000 | 0.000 |
| 1 | 0.000 | 1.000 |

| IN / OUT | 0 | 1 |
|---|---|---|
| 0 | 0.99121094 | 0.00878906 |
| 1 | 0.02636719 | 0.97363281 |

| IN / OUT | 0 | 1 |
|---|---|---|
| 0 | -0.0087906 | 0.00878906 |
| 1 | 0.02636719 | -0.02636719 |

| IN\OUT | 000 | 001 | 010 | 011 | 100 | 101 | 110 | 111 |
|---|---|---|---|---|---|---|---|---|
| 000 | 0.842 | 0.042 | 0.046 | 0.012 | 0.035 | 0.011 | 0.009 | 0.003 |
| 001 | 0.066 | 0.770 | 0.024 | 0.042 | 0.021 | 0.049 | 0.024 | 0.004 |
| 010 | 0.063 | 0.016 | 0.788 | 0.055 | 0.008 | 0.024 | 0.034 | 0.012 |
| 011 | 0.048 | 0.068 | 0.065 | 0.693 | 0.030 | 0.029 | 0.019 | 0.047 |
| 100 | 0.016 | 0.005 | 0.016 | 0.043 | 0.009 | 0.050 | 0.049 | 0.812 |
| 101 | 0.022 | 0.047 | 0.043 | 0.028 | 0.061 | 0.028 | 0.704 | 0.067 |
| 110 | 0.018 | 0.041 | 0.029 | 0.008 | 0.049 | 0.790 | 0.011 | 0.056 |
| 111 | 0.057 | 0.039 | 0.033 | 0.037 | 0.669 | 0.063 | 0.062 | 0.042 |

<3-QUBIT A-B-C CIRCUIT>    630

| IN\OUT | 000 | 001 | 010 | 011 | 100 | 101 | 110 | 111 |
|---|---|---|---|---|---|---|---|---|
| 000 | -0.158 | 0.042 | 0.046 | 0.012 | 0.035 | 0.011 | 0.009 | 0.003 |
| 001 | 0.066 | -0.230 | 0.024 | 0.042 | 0.021 | 0.049 | 0.024 | 0.004 |
| 010 | 0.063 | 0.016 | -0.212 | 0.055 | 0.008 | 0.024 | 0.034 | 0.012 |
| 011 | 0.048 | 0.068 | 0.065 | -0.307 | 0.030 | 0.029 | 0.019 | 0.047 |
| 100 | 0.016 | 0.005 | 0.016 | 0.043 | 0.009 | 0.050 | 0.049 | -0.188 |
| 101 | 0.022 | 0.047 | 0.043 | 0.028 | 0.061 | 0.028 | -0.296 | 0.067 |
| 110 | 0.018 | 0.041 | 0.029 | 0.008 | 0.049 | -0.210 | 0.011 | 0.056 |
| 111 | 0.057 | 0.039 | 0.033 | 0.037 | -0.331 | 0.063 | 0.062 | 0.042 |

METHOD FOR MITIGATING AN ERROR OF QUANTUM CIRCUIT AND APPARATUS THEREOF

CROSS-REFERENCE TO RELATED APPLICATION

This application claims priority to Korean Patent Application No. 10-2019-0177499 filed Dec. 30, 2019, the disclosure of which is hereby incorporated by reference in its entirety.

BACKGROUND OF THE INVENTION

1. Field of the Invention

The present disclosure relates to quantum computer technology, and more particularly, to a method for easily mitigating errors existing in quantum circuits constituting a quantum computer, and an apparatus therefor.

2. Description of Related Art

A quantum computer is a new concept computer capable of simultaneously processing a number of pieces of information using the unique physical properties of quantum such as superposition, entanglement, and the like. There is an increasing need for a quantum computer as an alternative to break through the limitations on the performance of classical computers due to leakage current generated in microcircuits of modern semiconductor chips. The quantum computer is able to solve problems at a high speed by exponentially increasing the information processing and computation speed through quantum parallel processing using a quantum bit or a qubit, which is a quantum information unit, as a basic unit of information processing. Accordingly, the quantum computers are expected to bring huge innovations in various industries such as finance, chemistry, pharmaceuticals, etc. thanks to strengths thereof in complicated computation and mass data processing such as optimal path searching, prime factorization, mass data searching, and the like.

Primary element technologies constituting the quantum computer include qubit implementation technology, quantum algorithm technology, quantum error correction code (QECC) technology, and quantum circuit technology. Among the above technologies, quantum circuit technology includes a technique for implementing a quantum gate to process a qubit, which is a quantum information unit, and a technique for correcting errors existing in the quantum circuit.

Basically, errors existing in a quantum circuit include errors according to the types of the quantum gates constituting the circuit and errors according to the sequence of the quantum gates. That is, the errors existing in the quantum circuit may differ depending on the sequence of the quantum gates, as well as the configurations of the quantum gates. Therefore, an existing quantum circuit error correction technology corrects errors in the corresponding circuit in consideration of both the types and the sequence of the quantum gates constituting the quantum circuit. However, this quantum circuit error correction technology has a problem that a considerable amount of time and energy is required for correcting errors in the quantum circuit due to complex computations thereof.

SUMMARY OF THE INVENTION

It is an objective of the present disclosure to solve the above and other problems. Another objective of the present disclosure is to provide a quantum circuit error mitigation method capable of effectively mitigating errors existing in a corresponding circuit, regardless of the sequence of quantum gates constituting the quantum circuit, and an apparatus therefor.

Another objective of the present disclosure is to provide a quantum circuit error mitigation method capable of effectively mitigating errors existing in a corresponding circuit based on error mitigation matrix information depending on the type of quantum circuit, and an apparatus therefor.

In order to attain the above or other objectives, according to an aspect of the present disclosure, there is provided a quantum circuit error mitigation method including: obtaining a plurality of pieces of first probability matrix information according to the sequence of quantum gates constituting a quantum circuit; obtaining a plurality of pieces of second probability matrix information according to the sequence of quantum gates constituting the quantum circuit; generating a plurality of pieces of differential matrix information based on the plurality of pieces of first and second probability matrix information; and generating error mitigation matrix information corresponding to the quantum circuit using the plurality of pieces of differential matrix information.

According to another aspect of the present disclosure, there is provided a quantum circuit error mitigation apparatus including: a probability matrix generation unit configured to obtain a plurality of pieces of first and second probability matrix information according to the sequence of quantum gates constituting a quantum circuit; a differential matrix generation unit configured to generate a plurality of pieces of differential matrix information based on the plurality of pieces of first and second probability matrix information; a mitigation matrix generation unit configured to generate error mitigation matrix information corresponding to the quantum circuit using the plurality of pieces of differential matrix information; and a data storage unit configured to store the error mitigation matrix information generated through the mitigation matrix generation unit.

According to another aspect of the present disclosure, there is provided a computer program stored in a computer-readable recording medium so as to execute, in a computer, operations of obtaining a plurality of pieces of first probability matrix information according to the sequence of quantum gates constituting a quantum circuit, obtaining a plurality of pieces of second probability matrix information according to the sequence of quantum gates constituting the quantum circuit, generating a plurality of pieces of differential matrix information based on the plurality of pieces of first and second probability matrix information, and generating error mitigation matrix information corresponding to the quantum circuit using the plurality of pieces of differential matrix information.

BRIEF DESCRIPTION OF THE DRAWINGS

The above and other aspects, features, and advantages of the present disclosure will be more apparent from the following detailed description taken in conjunction with the accompanying drawings, in which:

FIG. 1 is a diagram illustrating the types of quantum gates in relation to the present disclosure;

FIG. 4 is a flowchart illustrating a method of generating an error mitigation matrix according to an embodiment of the present disclosure;

FIGS. 5A to 5E and FIGS. 6A to 6C are reference diagrams for explaining a method of generating an error mitigation matrix of a quantum circuit.

DESCRIPTION OF THE INVENTION

Figure 2:
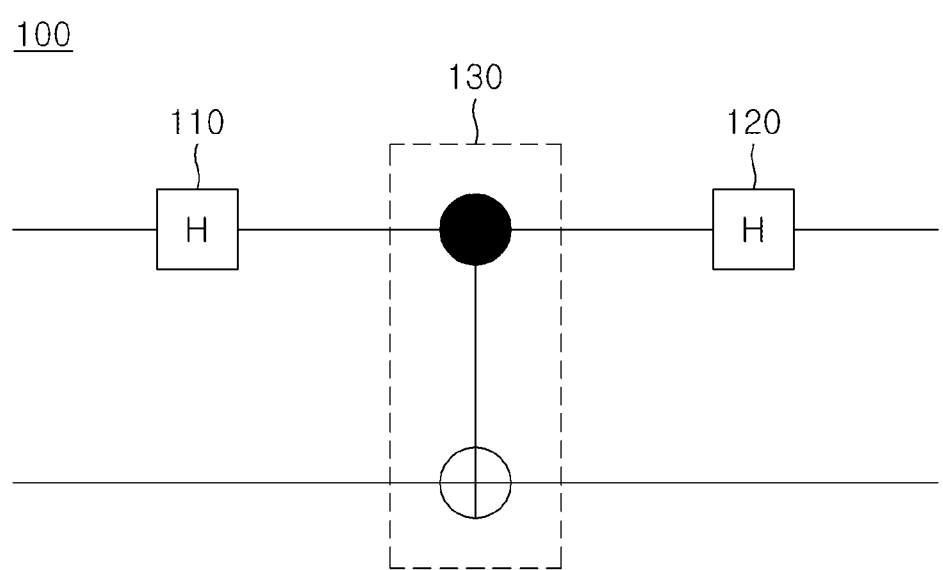
FIG. 2 is a diagram illustrating an example of a quantum circuit configured using the quantum gates in FIG. 1.

Hereinafter, embodiments disclosed in the present specification will be described in detail with reference to the accompanying drawings, wherein the same or similar elements will be denoted by the same reference numerals, regardless of drawings, and redundant descriptions thereof will be omitted. The suffixes "module" and "unit" for elements used in the following description are given or used interchangeably in consideration of only the ease of preparation of the specification, and do not have their own distinct meanings or roles. That is, the term "unit" used in the present disclosure refers to a software or hardware element such as FPGA or ASIC, and a "unit" plays specific roles. However, the "unit" is not limited to software or hardware. The "unit" may be configured to be provided in an addressable storage medium, or may be configured to reproduce one or more processors. Thus, for example, the "unit" includes elements such as software elements, object-oriented software elements, class elements, and task elements, processes, functions, properties, procedures, subroutines, segments of program code, drivers, firmware, microcode, circuits, data, database, data structures, tables, arrays, and variables. The functions provided by the elements and "units" may be combined into a smaller number of elements and "units", or may be further divided into additional elements and "units".

In addition, in describing the embodiments disclosed in the present specification, if it is determined that a detailed description of the prior art related thereto may obscure the subject matter of the embodiments disclosed in the present specification, the detailed description thereof will be omitted. In addition, the accompanying drawings are merely intended to facilitate understanding of the embodiments disclosed in the present specification, and the technical idea disclosed in the present specification is not limited to the accompanying drawings, and it should be understood that the drawings encompass all modifications included in the spirit and scope of the present disclosure and equivalents or substitutes thereof.

The present disclosure proposes a quantum circuit error mitigation method capable of effectively mitigating errors existing in a corresponding circuit, regardless of the sequence of quantum gates constituting the quantum circuit, and an apparatus therefor. In addition, the present disclosure proposes a quantum circuit error mitigation method capable of effectively mitigating errors existing in a corresponding circuit based on error mitigation matrix information depending on the types of quantum gates constituting the quantum circuit, and an apparatus therefor.

Hereinafter, various embodiments of the present disclosure will be described in detail with reference to the drawings.

FIG. 1 is a diagram illustrating the types of quantum gates in relation to the present disclosure, and FIG. 2 is a diagram illustrating an example of a quantum circuit configured using the quantum gates in FIG. 1.

Referring to FIG. 1, a quantum circuit constituting a quantum computer is comprised of a plurality of quantum gates. Although a quantum computer is able to be in the state in which the qubit thereof has both 0 and 1 at the same time, which is different from the bit of an existing computer, the quantum computer must be in a specific state during computation because it is also used for computation or the like. To this end, the quantum computer requires a quantum gate.

The quantum gate primarily performs computation through matrix multiplication of complex vectors. This is due to the fact that the qubit, which is a quantum information unit of the quantum computer, is expressed as a two-dimensional vector.

The quantum gates include a NOT gate, a Hadamard gate, Pauli XYZ gates, phase-shift gates (S gates and T gates), a CNOT gate, and a SWAP gate as the types thereof.

The NOT gate is the same as the NOT gate among the existing computer logic gates, and switches the state of a qubit from 0 to 1 or from 1 to 0.

The Hadamard gate switches a qubit in the state of 0 or 1 to an overlapping state (the state in which 0 and 1 exist at the same time). If the Hadamard gate is expressed as a matrix, it is expressed as the determinant shown in the drawing.

There are three types of Pauli gates, i.e., X, Y, and Z gates. These indicate that the qubit is rotated around the X, Y, and Z axes, respectively. The respective gates are expressed as matrices, they are expressed as the determinants (matrix equations) in the drawing.

The phase-shift gate changes the phase of a qubit. The phase-shift gate includes an S gate and a T gate as the type thereof, and the determinants thereof are shown in the drawing.

The CNOT gate shows an entanglement state in which one qubit affects another qubit in a quantum computer. The CNOT gate performs a NOT gate operation on a second qubit if a first qubit is 1.

The SWAP gate swaps the states between two qubits in a quantum computer. If the SWAP gate is expressed as a matrix, it is expressed as the determinant in the drawing.

Various quantum circuits may be configured by combining a plurality of quantum gates described above. For example, as shown in FIG. 2, a quantum circuit 100 may be configured by sequentially connecting a first Hadamard gate 110, a CNOT gate 130, and a third Hadamard gate 120.

However, since each quantum gate has its own error, the quantum circuit comprised of a plurality of quantum gates has errors accumulated by the respective quantum gates. In addition, the errors existing in the quantum circuit differ depending on the sequence of the quantum gates, as well as the configurations of the quantum gates. Therefore, it is necessary to mitigate the errors existing in the quantum circuit. Hereinafter, a method of mitigating errors existing in a quantum circuit, regardless of the sequence of quantum gates constituting the circuit, will be described in detail in this specification.

Figure 3:
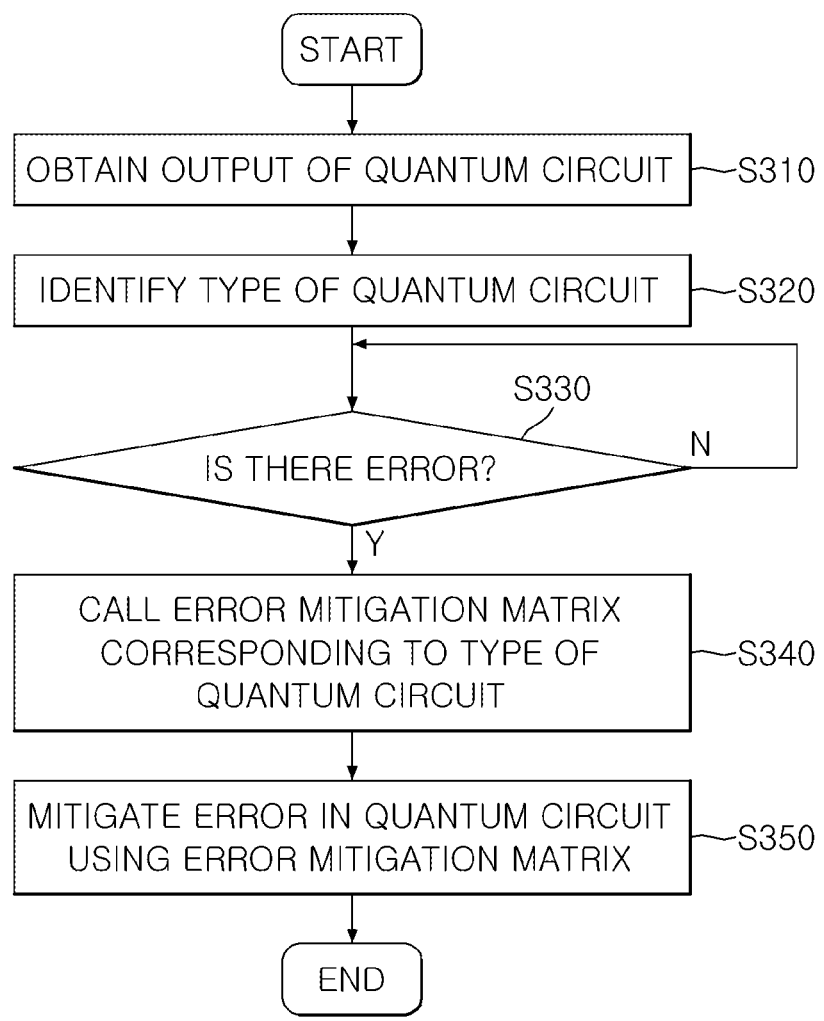
FIG. 3 is a flowchart illustrating a method of mitigating errors in a quantum circuit according to an embodiment of the present disclosure.
Figures 5A, 5B:
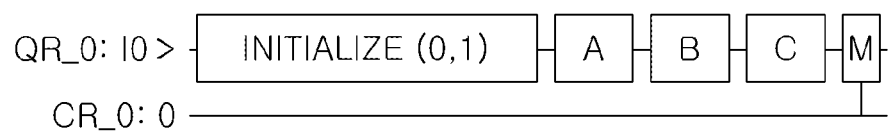

FIG. 3 is a flowchart illustrating a method of mitigating errors in a quantum circuit according to an embodiment of the present disclosure.

Referring to FIG. 3, a quantum circuit error mitigation apparatus according to an embodiment of the present disclosure may be installed inside a quantum computer, and may perform an operation of mitigating errors in quantum circuits constituting the quantum computer.

First, the quantum circuit error mitigation apparatus may obtain an output of a quantum circuit that computes qubits (S310). Here, the quantum circuit may be any one of a plurality of quantum circuits constituting a quantum computer.

The quantum circuit error mitigation apparatus may identify the type of the quantum circuit that computes qubits (S320). In this case, the quantum circuit error mitigation apparatus may identify the type of the quantum circuit based on an output value of the corresponding circuit. In addition, the quantum circuit error mitigation apparatus may identify the type of the quantum circuit using various methods.

The quantum circuit error mitigation apparatus may check whether or not there is a predetermined error in the output of the identified quantum circuit (S330).

If there is a predetermined error in the output of the identified quantum circuit as a result of checking in step 330, the quantum circuit error mitigation apparatus may call an error mitigation matrix corresponding to the type of the quantum circuit from a data storage unit (e.g., a memory or a database) (340). Here, the error mitigation matrix is a matrix for mitigating the error existing in the quantum circuit, regardless of the sequence of quantum gates constituting the corresponding circuit.

The quantum circuit error mitigation apparatus may mitigate the error existing in the quantum circuit using the error mitigation matrix called from the data storage unit (S350).

As described above, the quantum circuit error mitigation method according to the present disclosure is able to effectively mitigate errors existing in the quantum circuit, regardless of the sequence of the quantum gates constituting the corresponding circuit, using error mitigation matrices in the database.

FIG. 4 is a flowchart illustrating a method of generating an error mitigation matrix according to an embodiment of the present disclosure, and FIGS. 5A to 5E and 6A to 6C are reference diagrams for explaining a method of generating an error mitigation matrix of a quantum circuit.

Referring to FIGS. 4 to 6, a quantum circuit error mitigation apparatus according to the present disclosure may select (or specify) a quantum circuit including one or more quantum gates according to a user command or the like (S410).

The quantum circuit error mitigation apparatus may obtain or generate a plurality of pieces of first probability matrix information according to all possible sequence combinations of the quantum gates constituting the selected quantum circuit (S420). Here, the first probability matrix information refers to a matrix representing information on the probability depending on an input/output qubit in the case where there is no error in a quantum circuit according to a specific gate sequence (i.e., in the case of an ideal quantum circuit).

For example, as shown in FIGS. 5A to 5E and 6A to 6C, if the types of quantum gates constituting a quantum circuit are gate "A", gate "B", and gate "C", the sequences of the quantum gates may have a total of 6 combinations such as "A-B-C", "A-C-B", "B-A-C", "B-C-A", "C-A-B", and "C-B-A". However, if two or more of the three quantum gates are identical to each other, the number of sequence combinations of the quantum gates may be reduced below 6.

The quantum circuit error mitigation apparatus may obtain or generate first probability matrix information 510 or 610 for each of the quantum circuits according to the sequence combinations of the quantum gates. Here, the number of pieces of the first probability matrix information 510 or 610 corresponds to the total number (e.g., 6) of the combinable sequences of the quantum gates constituting the quantum circuit.

The quantum circuit error mitigation apparatus may obtain or generate a plurality of pieces of second probability matrix information according to all possible sequence combinations of the quantum gates constituting the selected quantum circuit (S430). Here, the second probability matrix information refers to a matrix representing information on the probability depending on input/output qubits in the case where there is an error in the quantum circuit according to a specific gate sequence (i.e., in the case of a real quantum circuit).

For example, as shown in FIGS. 5A to 5E and 6A to 6C, if the types of quantum gates constituting a quantum circuit are gate "A", gate "B", and gate "C", the quantum circuit error mitigation apparatus may obtain or generate second probability matrix information 520 or 620 for each of the quantum circuits according to the sequence combinations of the quantum gates. Similarly, the number of pieces of the second probability matrix information 520 or 620 corresponds to the total number (e.g., 6) of the combinable sequences of the quantum gates constituting the quantum circuit.

The quantum circuit error mitigation apparatus may generate a plurality of pieces of differential matrix information based on the plurality of pieces of first and second probability matrix information (S440). That is, the quantum circuit error mitigation apparatus may generate differential matrix information by subtracting the first probability matrix information from the second probability matrix information. For example, as shown in FIGS. 5A to 5E and 6A to 6C, if the types of the quantum gates constituting the quantum circuit are gate "A", gate "B", and gate "C", the quantum circuit error mitigation apparatus may generate a plurality of pieces of differential matrix information 530 or 630 by subtracting the respective pieces of the first probability matrix information 510 or 610 from the respective pieces of the second probability matrix information 520 or 620. Likewise, the number of pieces of differential matrix information 530 or 630 corresponds to the total number of the combinable sequences of the quantum gates constituting the quantum circuit.

Figure 6A:
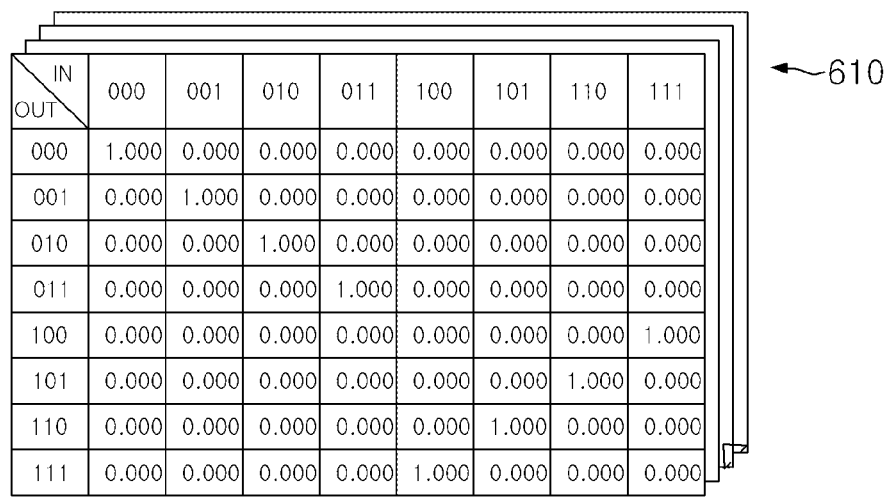

Meanwhile, the probability matrix information 510, 520, 610, or 620 and the differential matrix information 530 or 630 have different numbers of rows and columns depending on the number of qubits input to the quantum circuit. For example, as shown in FIGS. 5A to 5E, if one qubit is input to the quantum circuit, each piece of the probability matrix information 510 and 520 and the differential matrix information 530 may be expressed as a 2*2 matrix. On the other hand, as shown in FIGS. 6A to 6C, if three qubits are input to the quantum circuit, each piece of the probability matrix information 610 and 620 and the differential matrix information 630 may be expressed as an 8*8 matrix.

The quantum circuit error mitigation apparatus may generate final error mitigation matrix information using the plurality of pieces of differential matrix information (S450). For example, the quantum circuit error mitigation apparatus may calculate an average value of the plurality of pieces of differential matrix information, thereby generating one piece of final error mitigation matrix information.

The quantum circuit error mitigation apparatus may convert the generated error mitigation matrix information into a database (S460). That is, the quantum circuit error mitigation apparatus may store the generated error mitigation matrix information in the database. The error mitigation matrix information converted to the database is used to mitigate errors in the quantum circuit, regardless of the sequence of the quantum gates constituting the corresponding circuit.

The quantum circuit error mitigation apparatus may check whether or not another quantum circuit including one or more quantum gates is selected according to a user command or the like (S470). If another quantum circuit is selected as a result of the checking, the quantum circuit error mitigation apparatus may repeat the operations in steps 420 to 460 described above.

On the other hand, if there is no second probability matrix information on a specific quantum circuit, the quantum circuit error mitigation apparatus may perform machine learning on a number of pieces of error mitigation matrix information previously stored in the database, thereby generating error mitigation matrix information corresponding to the quantum circuit. That is, the quantum circuit error mitigation apparatus may perform machine learning on a number of pieces of error mitigation matrix information stored in the database, instead of calculating the probability and differential matrix information according to the sequence combinations of quantum gates constituting a specific quantum circuit, thereby automatically generating error mitigation matrix information corresponding to the gate configuration of the quantum circuit. In this case, a deep learning algorithm may be used as the algorithm for machine learning, but is not limited thereto.

Figure 7:
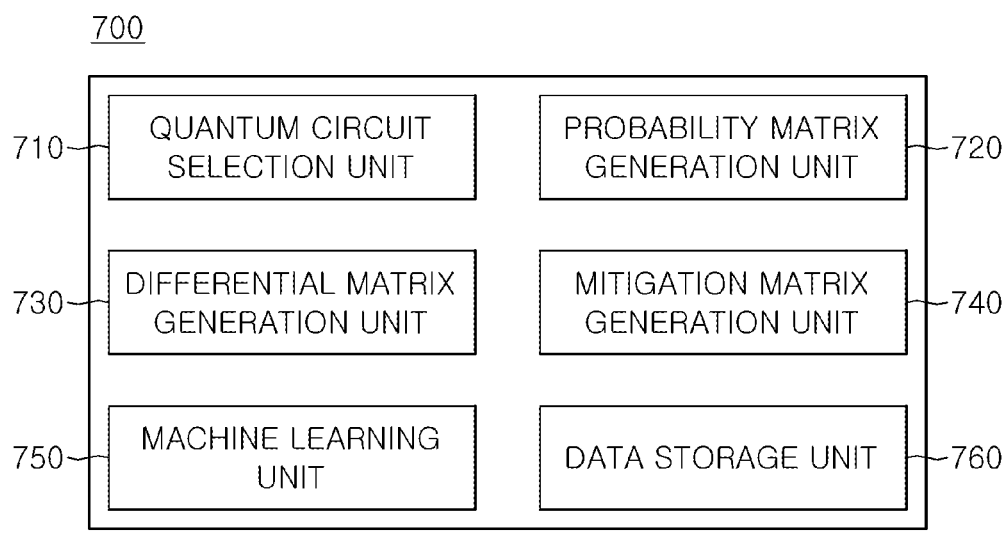
FIG. 7 is a block diagram of an error mitigation matrix generation apparatus according to an embodiment of the present disclosure.

FIG. 7 is a block diagram illustrating the configuration of a quantum circuit error mitigation apparatus according to an embodiment of the present disclosure.

Referring to FIG. 7, a quantum circuit error mitigation apparatus 700 according to an embodiment of the present disclosure includes a quantum circuit selection unit 710, a probability matrix generation unit 720, a differential matrix generation unit 730, and a mitigation matrix generation unit 740, a machine learning unit 750, and a data storage unit 760. The elements shown in FIG. 7 are not essential for implementation of an error mitigation matrix generation apparatus, so the error mitigation matrix generation apparatus described herein may have more or fewer elements than the above-described elements.

The quantum circuit selection unit 710 may select (or specify) a quantum circuit including one or more quantum gates according to a user command or the like. Here, the selected quantum circuit is a quantum circuit to be an object for which an error mitigation matrix is generated.

The probability matrix generation unit (or probability matrix obtaining unit) 720 may obtain or generate a plurality of pieces of first probability matrix information according to all possible sequence combinations of the quantum gates constituting the selected quantum circuit. Here, each piece of the first probability matrix information refers to a matrix representing information on the probability depending on input/output qubits in the case where there is no error in the quantum circuit according to a specific gate sequence.

In addition, the probability matrix generation unit 720 may obtain or generate a plurality of pieces of second probability matrix information according to all possible sequence combinations of the quantum gates constituting the selected quantum circuit. Here, each piece of the second probability matrix information refers to a matrix representing information on the probability depending on input/output qubits in the case where there is an error in the quantum circuit according to a specific gate sequence.

The differential matrix generation unit 730 may generate a plurality of pieces of differential matrix information based on the first and second probability matrix information according to all possible sequence combinations of the quantum gates constituting the selected quantum circuit. That is, the differential matrix generation unit 730 may generate a plurality of pieces of differential matrix information by subtracting the respective pieces of the first probability matrix information from the respective pieces of the second probability matrix information.

The mitigation matrix generation unit 740 may generate final error mitigation matrix information using the plurality of pieces of differential matrix information. In this case, the mitigation matrix generation unit 740 may generate one piece of final error mitigation matrix information by calculating an average value of the plurality of pieces of differential matrix information.

The data storage unit 760 may include a plurality of pieces of probability matrix information generated through the probability matrix generation unit 720, a plurality of pieces of differential matrix information generated through the differential matrix generation unit 730, and error mitigation matrix information generated through the mitigation matrix generation unit 740. The error mitigation matrix information stored in the data storage unit 760 is used to mitigate an error in a quantum circuit regardless of the sequence of the quantum gates constituting the corresponding circuit.

If there is no second probability matrix information on a specific quantum circuit, the machine learning unit 750 may perform machine learning on a number of pieces of error mitigation matrix information stored in the data storage unit 760, thereby generating error mitigation matrix information corresponding to the quantum circuit.

The present disclosure described above may be implemented as computer-readable code in a medium on which a program is recorded. Computer-readable media includes all types of recording devices that store data that can be read by computer systems. Examples of the computer-readable media may include a hard disk drive (HDD), a solid state disk (SSD), a silicon disk drive (SDD), ROM, RAM, CD-ROM, a magnetic tape, a floppy disk, an optical data storage device, and the like. Therefore, the above detailed description should not be construed as restrictive in all respects, and should be considered as illustrative. The scope of the present disclosure should be determined by reasonable interpretation of the appended claims, and all modifications within the equivalent scope of the present disclosure shall be included in the scope of the present disclosure.

What is claimed is:

1. A method of mitigating an error of a quantum circuit by a quantum circuit error mitigation apparatus including one or more processors and a memory, the method comprising:
    obtaining, by the one or more processors, a plurality of first probability matrix information corresponding to all possible sequence combination of quantum gates constituting a quantum circuit;
    obtaining, by the one or more processors, a plurality of second probability matrix information corresponding to all possible sequence combination of quantum gates constituting the quantum circuit;
    generating, by the one or more processors, a plurality of differential matrix information based on the plurality of first and second probability matrix information; and
    generating, by the one or more processors, error mitigation matrix information corresponding to the quantum circuit using the plurality of differential matrix information.

2. The method of claim 1, further comprising selecting, by the one or more processors, a quantum circuit including one or more quantum gates.

3. The method of claim 1, further comprising converting, by the one or more processors, the generated error mitigation matrix information into a database (DB).

4. The method of claim 3, further comprising generating, by the one or more processors, error mitigation matrix information corresponding to another quantum circuit other than the quantum circuit by performing machine learning on the error mitigation matrix information converted into the database (DB).

5. The method of claim 1, wherein each of the first probability matrix information is matrix information indicating probability information depending on input/output qubits in the case where there is no error in a quantum circuit according to a specific gate sequence.

6. The method of claim 1, wherein each of the second probability matrix information is matrix information representing probability information depending on input/output qubits in the case where there is an error in a quantum circuit according to a specific gate sequence.

7. The method of claim 1, wherein generating the plurality of differential matrix information comprises generating, by the one or more processors, the plurality of differential matrix information by subtracting respective first probability matrix information from respective second probability matrix information.

8. The method of claim 1, wherein generating the error mitigation matrix information comprises generating, by the one or more processors, the error mitigation matrix information corresponding to the quantum circuit by calculating an average value of the plurality of differential matrix information.

9. The method of claim 1, wherein the number of the first or second probability matrix information corresponds to the number of all possible sequence combinations of the quantum gates.

10. A quantum circuit error mitigation apparatus comprising:
one or more processors; and
a memory,
wherein the one or more processors are configured to:
obtain a plurality of first probability matrix information corresponding to all possible sequence combination of quantum gates constituting a quantum circuit;
obtain a plurality of second probability matrix information corresponding to all possible sequence combination of quantum gates constituting the quantum circuit;
generate a plurality of differential matrix information based on the plurality of first and second probability matrix information; and
generate error mitigation matrix information corresponding to the quantum circuit using the plurality of differential matrix information.

11. The quantum circuit error mitigation apparatus of claim 10, wherein the one or more processors are further configured to select a quantum circuit including one or more quantum gates.

12. The quantum circuit error mitigation apparatus of claim 10, wherein each of the first probability matrix information is matrix information indicating probability information depending on input/output qubits in the case where there is no error in a quantum circuit according to a specific gate sequence.

13. The quantum circuit error mitigation apparatus of claim 10, wherein each of the second probability matrix information is matrix information representing probability information depending on input/output qubits in the case where there is an error in a quantum circuit according to a specific gate sequence.

14. The quantum circuit error mitigation apparatus of claim 10, wherein the one or more processors are further configured to generate the plurality of differential matrix information by subtracting respective first probability matrix information from respective second probability matrix information.

15. The quantum circuit error mitigation apparatus of claim 10, wherein the one or more processors are further configured to generate error mitigation matrix information corresponding to the quantum circuit by calculating an average value of the plurality of differential matrix information.

16. The quantum circuit error mitigation apparatus of claim 10, wherein the number of the first or second probability matrix information corresponds to the number of all possible sequence combinations of the quantum gates.

17. The quantum circuit error mitigation apparatus of claim 10, wherein the one or more processors are further configured to convert the generated error mitigation matrix information into a database (DB).

18. The quantum circuit error mitigation apparatus of claim 17, wherein the one or more processors are further configured to generate error mitigation matrix information corresponding to another quantum circuit other than the quantum circuit by performing machine learning on the error mitigation matrix information converted into the database (DB).

* * * * *